(12) United States Patent
Kennedy, Jr.

(10) Patent No.: US 11,755,819 B2
(45) Date of Patent: *Sep. 12, 2023

(54) DIRECT RENDERING OF A WEB APPLICATION FROM A DATABASE TO A WEB BROWSER

(71) Applicant: BackOffice Associates, LLC, South Harwich, MA (US)

(72) Inventor: Thomas R. Kennedy, Jr., Miami Beach, FL (US)

(73) Assignee: BackOffice Associates, LLC, Needham Heights, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,959

(22) Filed: May 15, 2020

(65) Prior Publication Data

US 2020/0349316 A1 Nov. 5, 2020

Related U.S. Application Data

(63) Continuation of application No. 15/160,402, filed on May 20, 2016, now Pat. No. 10,657,316, which is a continuation of application No. 12/020,048, filed on Jan. 25, 2008, now Pat. No. 9,396,278, which is a continuation of application No. 10/970,191, filed on
(Continued)

(51) Int. Cl.
| | | |
|---|---|---|
| *G06F 40/166* | (2020.01) | |
| *G06F 16/958* | (2019.01) | |
| *G06F 16/23* | (2019.01) | |
| *G06F 40/103* | (2020.01) | |
| *G06F 40/134* | (2020.01) | |
| *G06F 3/0482* | (2013.01) | |
| *H04L 67/02* | (2022.01) | |

(52) U.S. Cl.
CPC ........ *G06F 40/166* (2020.01); *G06F 16/2365* (2019.01); *G06F 16/958* (2019.01); *G06F 40/103* (2020.01); *G06F 40/134* (2020.01); *G06F 3/0482* (2013.01); *H04L 67/02* (2013.01); *Y10S 707/99945* (2013.01); *Y10S 707/99948* (2013.01)

(58) Field of Classification Search
CPC .. G06F 40/166; G06F 16/958; G06F 16/2365; G06F 40/134; G06F 40/103; G06F 3/0482; H04L 67/02
USPC ................... 707/709; 715/206, 205
See application file for complete search history.

(56) References Cited

U.S. PATENT DOCUMENTS

| | | | |
|---|---|---|---|
| 6,535,883 B1 | 3/2003 | Lee et al. | |
| 6,714,928 B1 | 3/2004 | Calow | |
| 6,990,653 B1 * | 1/2006 | Burd ..................... | G06F 16/972 717/108 |

(Continued)

FOREIGN PATENT DOCUMENTS

WO 02/077753 10/2002

*Primary Examiner* — Dung K Chau
(74) *Attorney, Agent, or Firm* — Fish & Richardson P.C.

(57) ABSTRACT

A method includes selecting a database on a system and selecting a style format on the system. The database contains data information for the web application, and the style format is applied to the web application. The method also includes selecting a validation rule for the web application, selecting a business rule for the web application, dynamically rendering the web application from a database to a web browser, and dynamically editing the web application. The web application incorporates the selected database and the selected style format instantaneously upon dynamic rendering.

17 Claims, 7 Drawing Sheets

Related U.S. Application Data

Oct. 21, 2004, now Pat. No. 7,325,014, which is a continuation of application No. 10/947,996, filed on Sep. 23, 2004, now abandoned.

(56) References Cited

U.S. PATENT DOCUMENTS

| | | | |
|---|---|---|---|
| 7,096,418 B1 * | 8/2006 | Singhal | G06F 16/9574 715/205 |
| 7,117,504 B2 * | 10/2006 | Smith | G06F 8/20 719/328 |
| 7,272,637 B1 * | 9/2007 | Himmelstein | G06F 16/951 709/217 |
| 7,325,014 B1 | 1/2008 | Kennedy, Jr. | |
| 7,340,675 B1 * | 3/2008 | Hancock | G06F 40/186 715/234 |
| 7,451,403 B1 | 11/2008 | Srinivasan et al. | |
| 7,886,041 B2 | 2/2011 | Outhred et al. | |
| 9,396,278 B2 | 7/2016 | Kennedy, Jr. | |
| 2002/0138449 A1 * | 9/2002 | Kendall | G06Q 20/401 705/75 |
| 2002/0194227 A1 * | 12/2002 | Day | G06F 40/154 715/234 |
| 2003/0004983 A1 * | 1/2003 | Cohen | G06F 9/451 715/205 |
| 2003/0074206 A1 * | 4/2003 | Hoffman | G06Q 50/188 705/80 |
| 2003/0106022 A1 | 6/2003 | Goodacre et al. | |
| 2003/0154172 A1 * | 8/2003 | Guyan | G06Q 40/02 705/80 |
| 2003/0158795 A1 * | 8/2003 | Markham | G06Q 10/06 705/28 |
| 2003/0177079 A1 | 9/2003 | Krajewski et al. | |
| 2004/0254988 A1 * | 12/2004 | Rodriguez | G06Q 10/107 709/206 |
| 2004/0268231 A1 * | 12/2004 | Tunning | G06F 40/143 715/236 |
| 2005/0138198 A1 * | 6/2005 | May | H04L 69/24 709/233 |
| 2006/0037016 A1 | 2/2006 | Saha et al. | |
| 2006/0059107 A1 * | 3/2006 | Elmore | G06Q 30/0601 705/64 |
| 2006/0074981 A1 * | 4/2006 | Mauceri | G06F 40/143 |

* cited by examiner

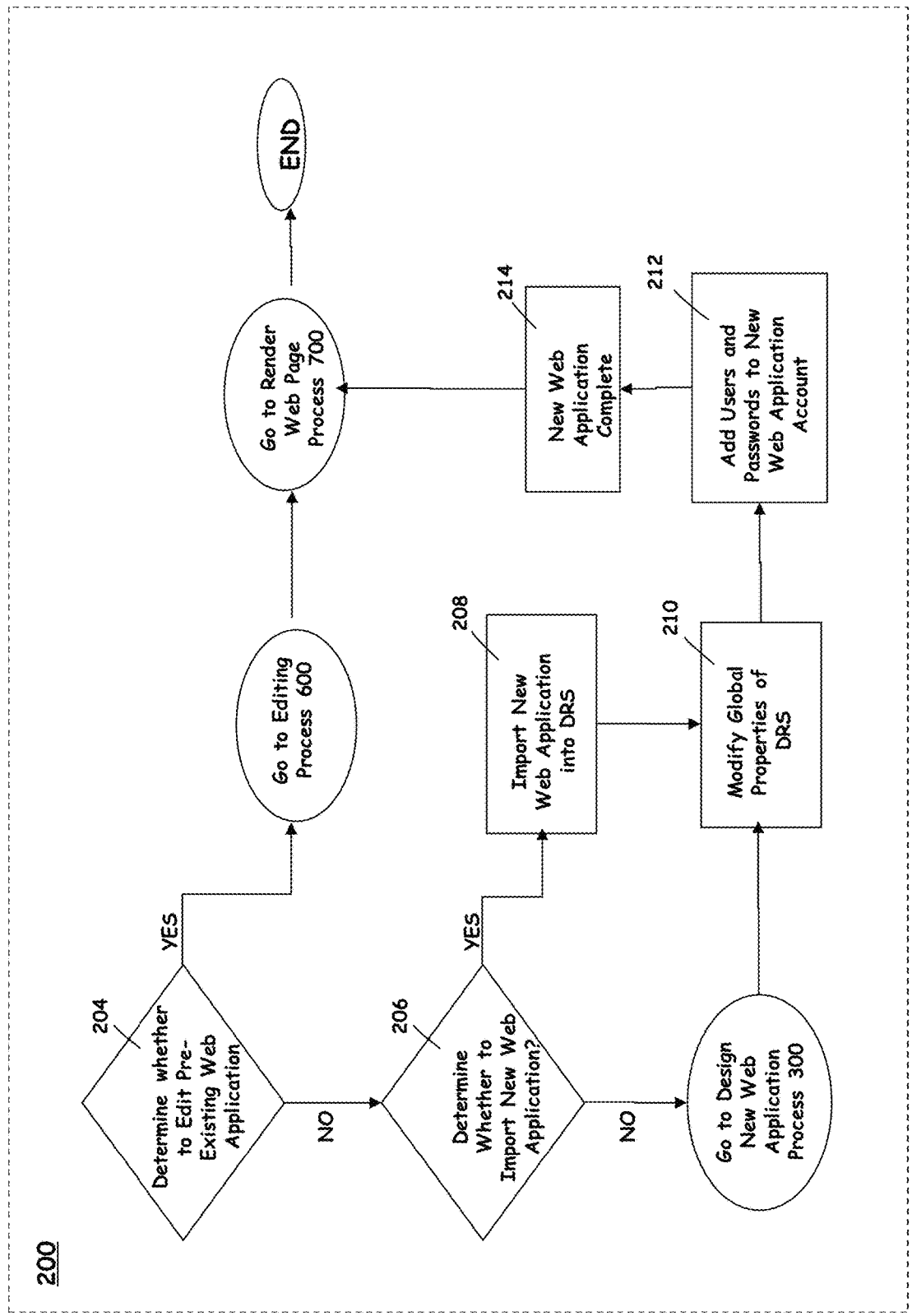
Fig. 2: Direct Rendering Process

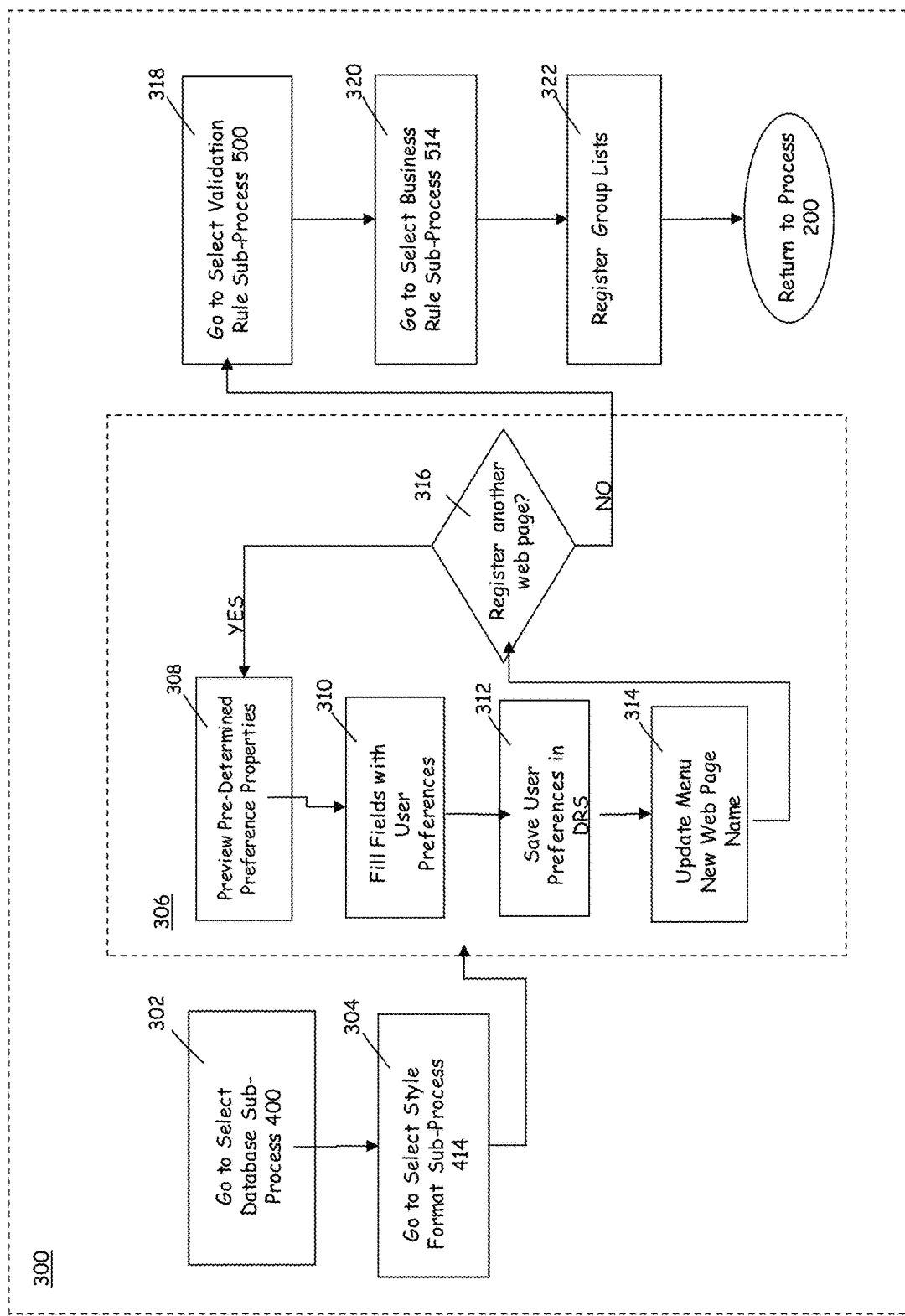
Fig. 3: Design New Web Application Process

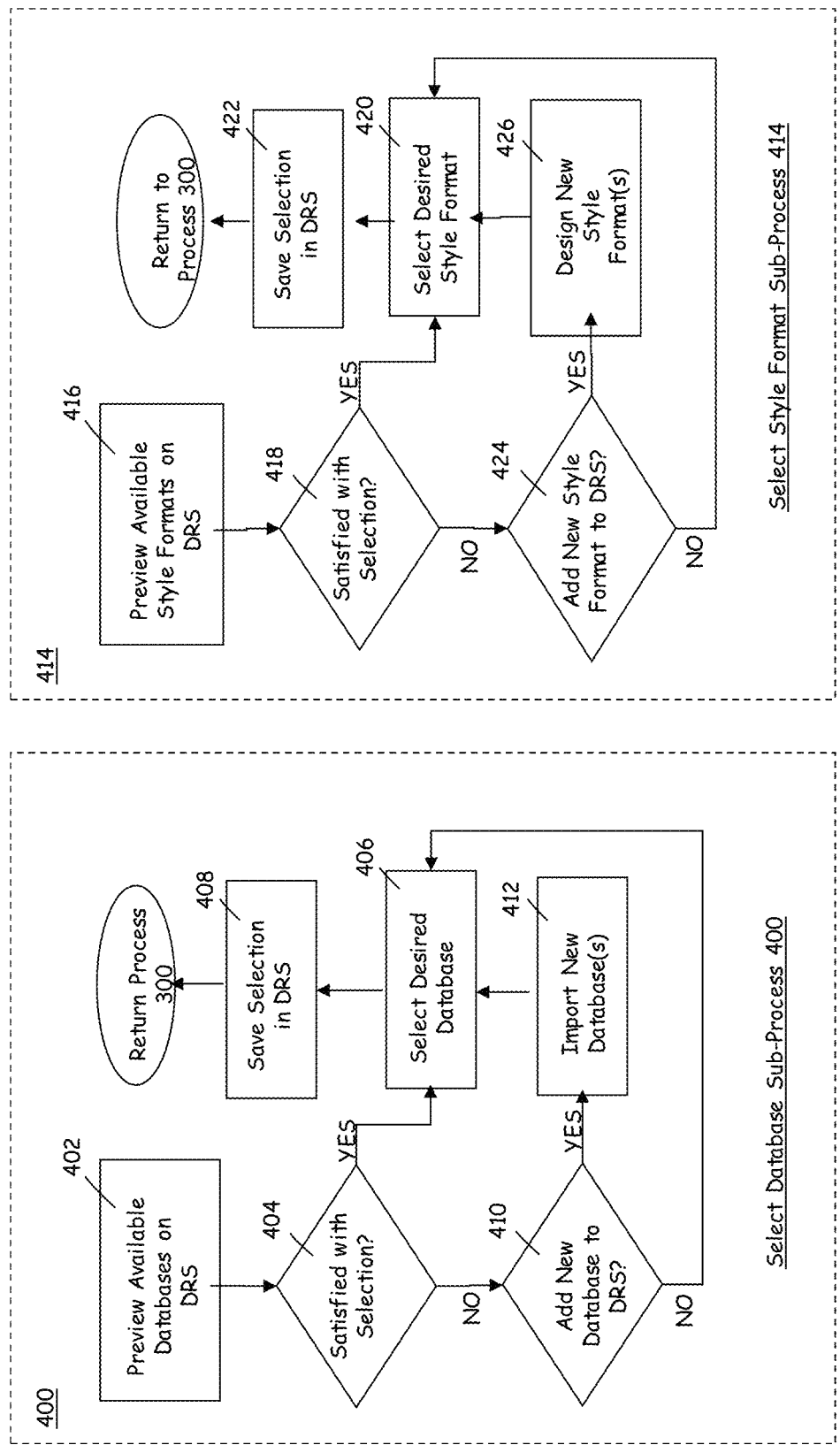
Fig. 4: Select Database and Style Format Sub-Processes

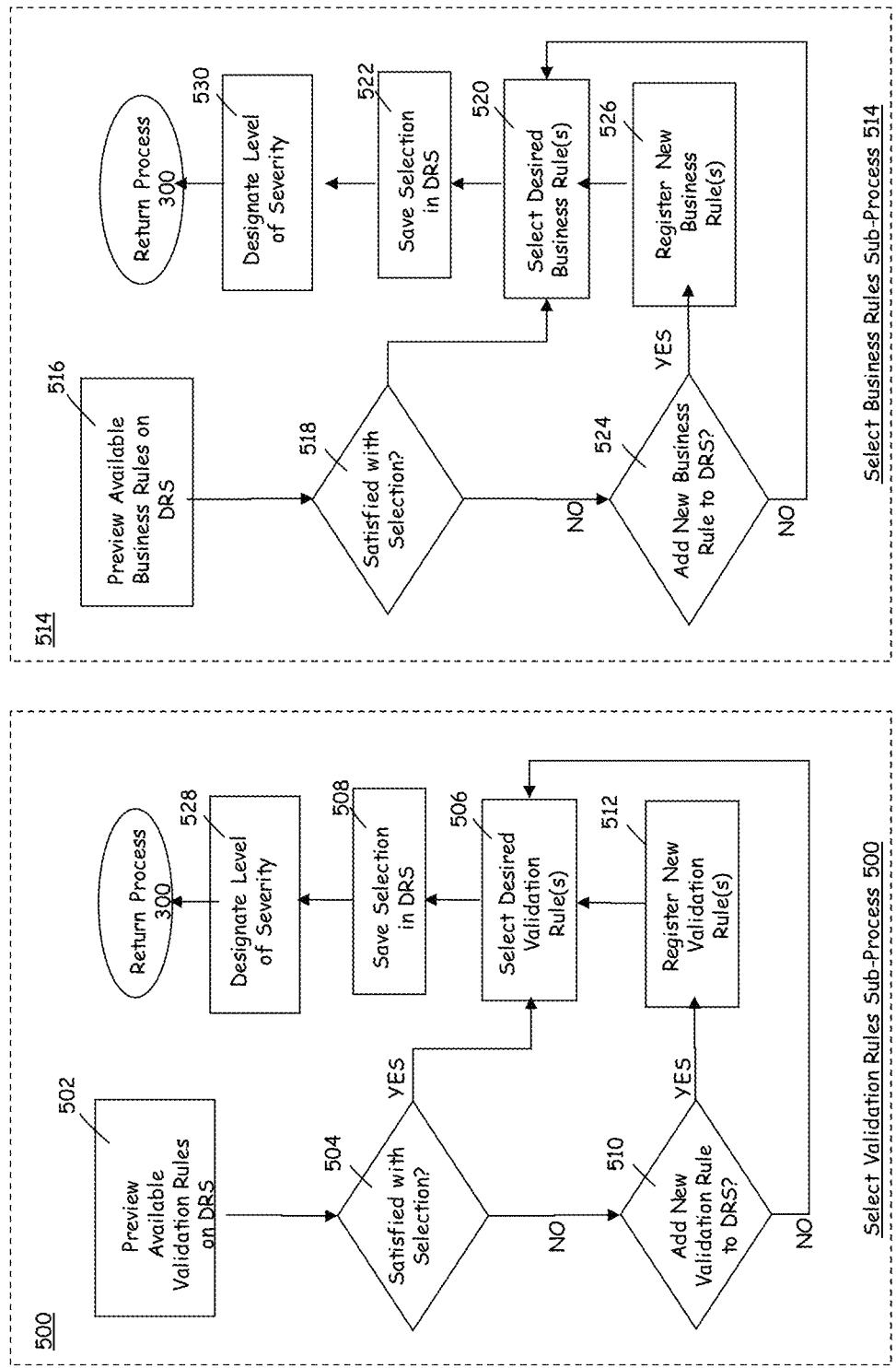
Fig. 5: Select Validation Rules and Select Business Rules Sub-Processes

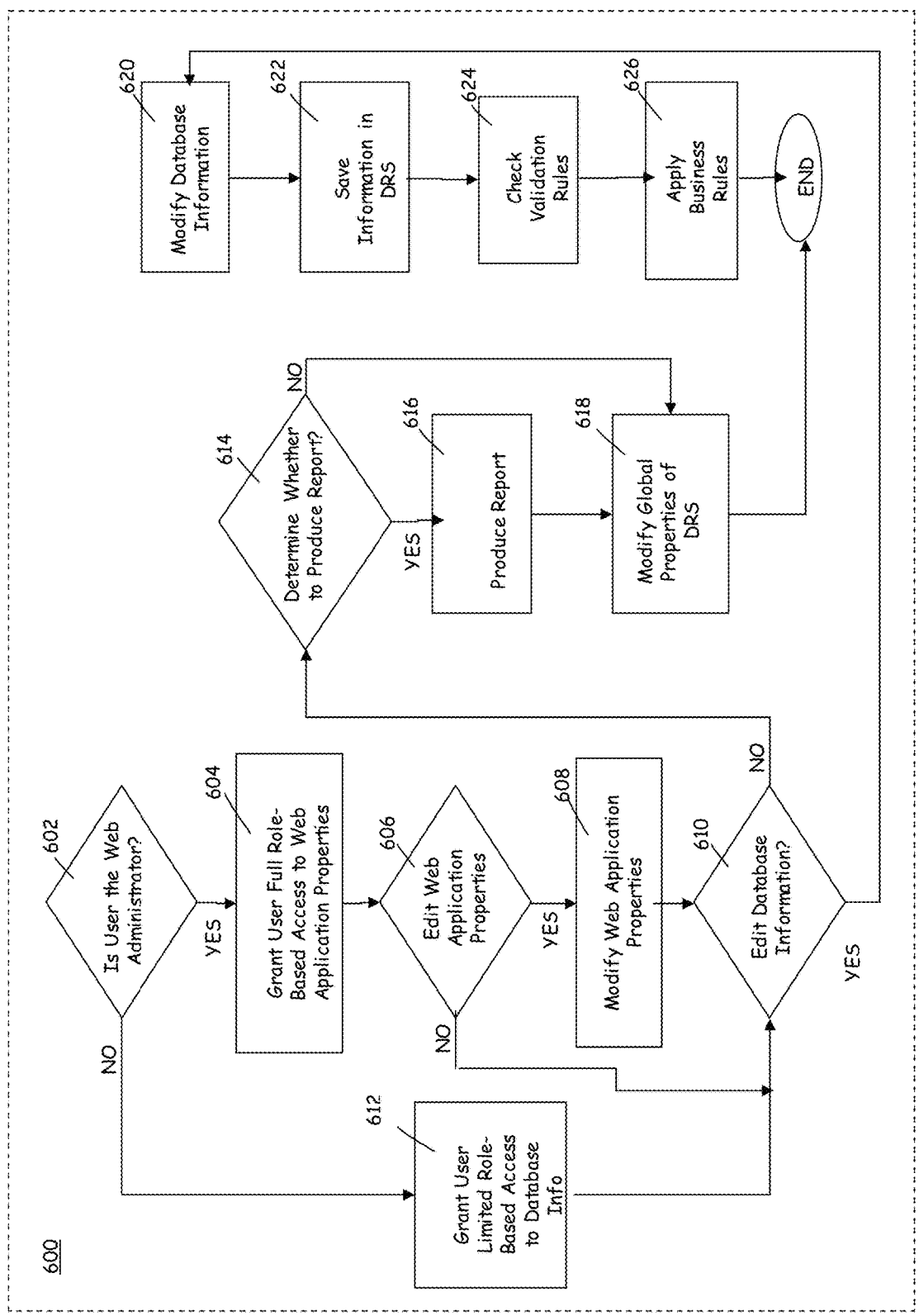
Fig. 6: Editing Process

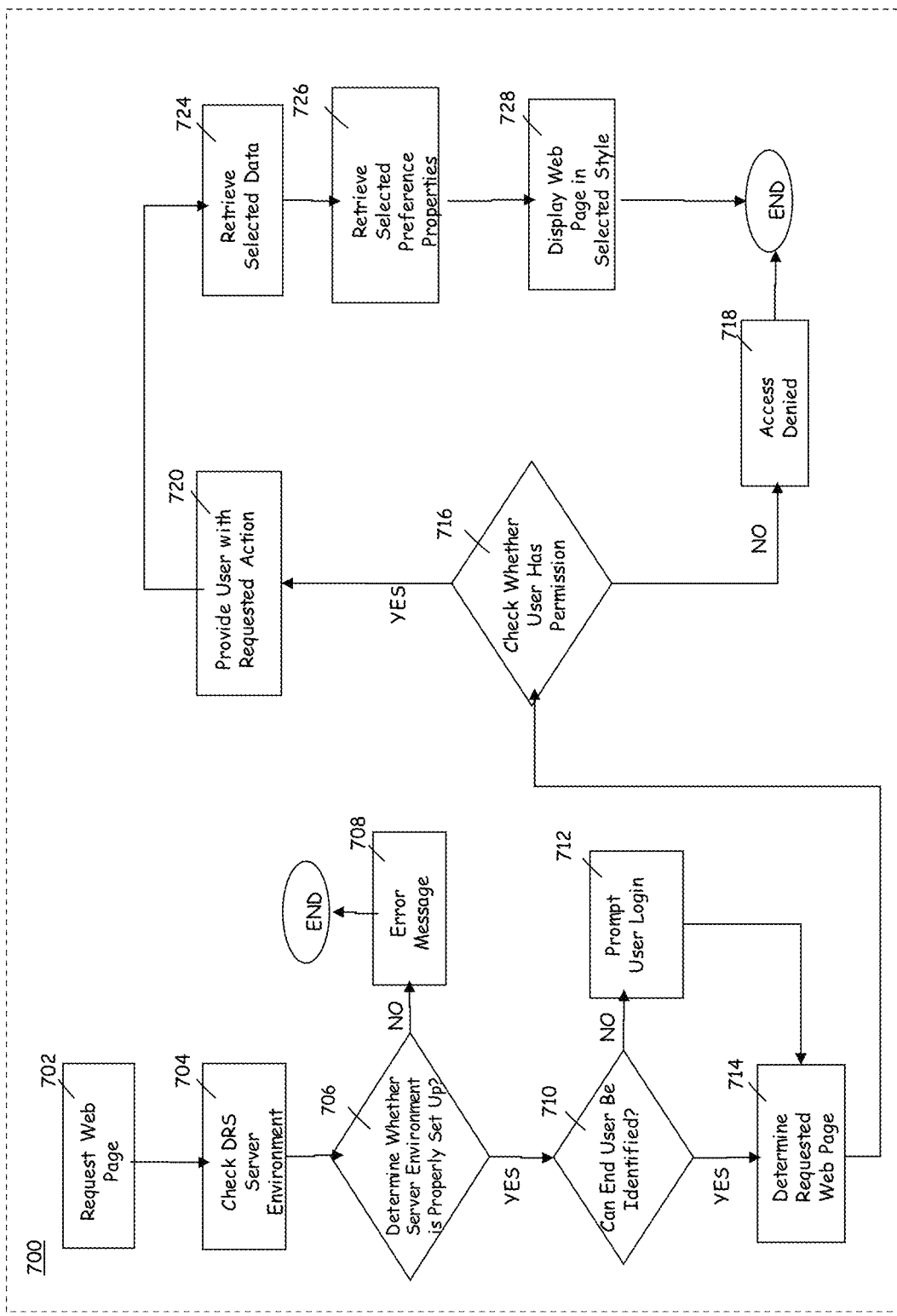

DIRECT RENDERING OF A WEB APPLICATION FROM A DATABASE TO A WEB BROWSER

CROSS REFERENCE TO RELATED APPLICATIONS

This application is a continuation application and claims priority under 35 U.S.C. § 120 to U.S. application Ser. No. 15/160,402, filed May 20, 2016, which is a continuation application and claims priority under 35 U.S.C. § 120 to U.S. application Ser. No. 12/020,048, filed Jan. 25, 2008, which is a continuation of U.S. application Ser. No. 10/970,191, filed Oct. 21, 2004, now U.S. Pat. No. 7,325,014, which is a continuation of U.S. application Ser. No. 10/947,996, filed Sep. 23, 2004, now abandoned, the complete disclosures of which are incorporated herein by reference.

TECHNICAL FIELD

This invention relates to web applications, and more particularly to a process for direct rendering of a web application from a database to a web browser.

BACKGROUND

A web application is a software program that uses hypertext markup language (HTML) as a communication protocol and delivers information to an end user in HTML. In the web application, web pages perform specific functions and exchange information using a database.

The web application is written with a combination of third-generation languages (3GL) and fourth-generation languages (4GL). Each language performs a different activity in the various layer of the web application. These various layers can include: a presentation layer, an application layer, and a database layer. The presentation layer can be written in JavaScript, Flash, HTML, or a combination thereof. The application layer can be written in Active Server Pages (ASP), Hypertext Preprocessor (PHP), Java Server Pages (JSP) or other application-oriented languages. The database layer, which stores the application information, can be managed in a Relational Database Management System 9(RDBMS) such as Microsoft® Access® or in a database system that uses standard RDBMS languages, such as Structured Query Language (SQL) or other similar 4GL database programming languages.

Manipulation and coding of each of these layers is highly labor intensive and time-consuming. Moreover, programming in the above languages requires sophisticated and specialized programming knowledge. Thus, modifying the web application requires experienced programmers who can competently code in all three layers of the web application. Unfortunately, since most programmers are highly specialized within their fields, they often do not gain exposure and experience with the various business processes which are captured by the web applications. Thus, oftentimes the individuals who best understand a corporation's needs and strategies are not the ones constructing and modifying the web application to address those needs. This disparity results in a loss of time, money, and even accuracy.

SUMMARY

The present invention provides methods and apparatus, including computer program products, for web applications, which are directly rendered from a database to a web browser without code.

In a general aspect, the application is directed to a method that includes selecting a database on a system and selecting a style format on the system. The database contains data information for a web application, and the style format is applied to the web application. The method also includes selecting a validation rule for the web application, selecting a business rule for the web application, dynamically rendering the web application from the database to a web browser, and dynamically editing the web application. The web application incorporates the selected database and the selected style format instantaneously upon being dynamically rendered.

Another aspect is a computer program product that is tangibly embodied in an information carrier. The computer program product is operable to cause a data processing apparatus, in a network of interconnected computers, to select a database on a system and select a style format on the system. The database contains data information for a web application, and the style format is applied to the web application. The computer program product also selects a validation rule for the web application, selects a business rule for the web application, dynamically renders the web application from the database to a web browser, and dynamically edits the web application. The web application incorporates the selected database and the selected style format instantaneously upon being dynamically rendered.

Yet another aspect is an apparatus that includes a system that provides means for selecting a database and means for selecting a style format on the system. The database contains data information for a web application, and the style format is applied to the web application. The system also provides means for selecting a validation rule for the web application, means for selecting a business rule for the web application, and means for dynamically editing the web application. The apparatus also includes a web browser through which the web application is being dynamically rendered from the database. The web application incorporates the selected database and the selected style format instantaneously upon being dynamically rendered.

Any of the above aspects may include one or more of the following features. One implementation dynamically renders the web application with an absence of code. In another implementation, the web application includes a web page that is interactive and customizable. Yet another implementation includes designing a web page. The designing of the web page further includes selecting a page type from a number of pre-designed page types or registering a new page type using the system; answering a pre-defined list of questions, the questions being associated with a plurality of properties for the web page; and adding a name for the web page to a menu. The name is linked to the web page.

In one implementation, the plurality of properties includes determining a source for the data information being associated with the web page, determining an amount for the data information being displayed on the web page, determining whether to permit adding a record to a table being associated with the web page, determining a manner for adding the record to the table, determining whether to permit editing the record in the table, determining the manner for editing the record, determining whether to permit deleting the record in the table, selecting the menu being associated with the web page, and determining whether the web page supports a persistent insert. The persistent insert includes adding the record continuously. The plurality of properties also includes determining whether the web page remains in a same location after the adding of the record, determining whether to permit downloading of the record from the web page, determining whether to bypass an edit mode for editing the records, determining whether to filter the data information being associated with a horizontal view and a vertical view, determining whether to filter the data information being displayed during run-time, determining whether to limit a quantity of the records being displayed on the web page, determining whether to make the validation rules optional, determining whether to permit filtering of the data information by an end user, determining whether to provide the end user with a quantity count of the records, determining whether to sort the data information alphabetically, determining a refresh rate being associated with the web page, determining whether to include static data information with the web page, determining whether to add records in an individual manner or in a multiple records manner, and determining whether to permit uploading of the record from the web page.

In another implementation, selecting the page type includes logic that is applied to the web page. Another implementation selects the database by selecting from a number of databases located on the system or importing a new database from an external source. The database is imported from the external source. Another implementation selects the style format by selecting from a number of style formats located on the system, or registering a new style format using the system. One implementation selects the validation rule by selecting from a number of validation rules located on the system, or registering a new validation rule using the system. Still another implementation selects the business rule by selecting from a number of business rules located on the system, or registering a new business rule using the system.

One implementation renders the web application by applying the validation rule to the web application. Another implementation renders the web application by applying the business rule to the web application.

In one implementation, dynamically editing further includes modifying the data information in the web application in real-time, displaying a change to the data information in the web application as soon as the change occurs, and editing a logical structure of the data information in the web application in real-time.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a flow diagram of a process for directly rendering a web application.

FIG. 3 is a flow diagram of a process for designing a new web application.

FIG. 4 is a flow diagram of a sub-process for selecting a database and a sub-process for selecting a style format for the new web application.

FIG. 5 is a flow diagram of a sub-process for selecting a validation rule and a sub-process for selecting a business rule for the new web application.

FIG. 6 is a flow diagram of a process for editing.

FIG. 7 is a flow diagram of a process for rendering a web page in real-time.

Like reference symbols in the various drawings indicate like elements.

DETAILED DESCRIPTION

Figure 1:
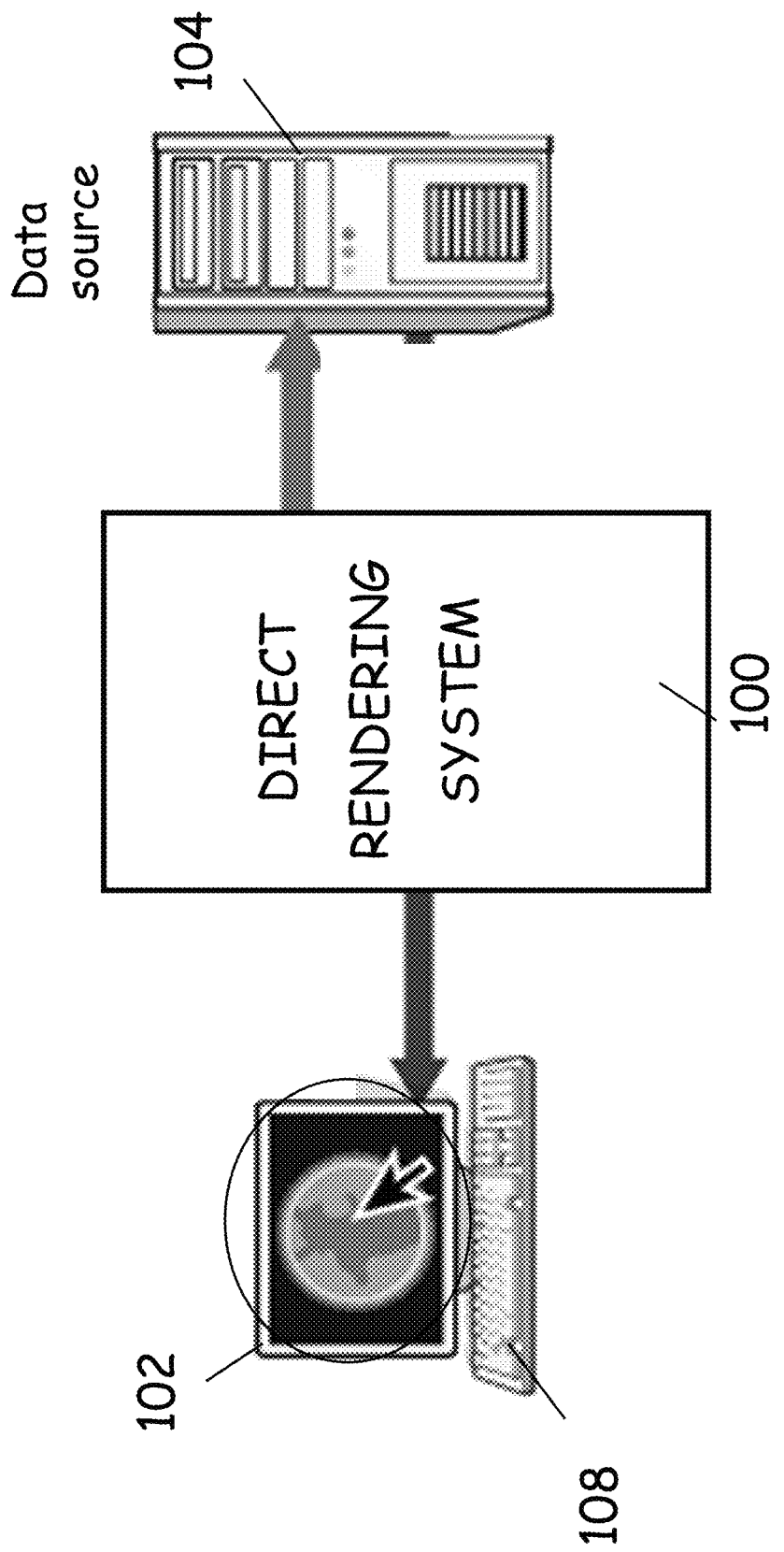
FIG. 1 shows a general diagram for a Direct Rendering System (DRS).

As shown in FIG. 1, Direct Rendering System (DRS) 100 renders and manages web application 102, which contains a number of web pages. Specifically, DRS 100 enables end users to render web application 102 (located on the database layer) into client browser 108 (located on the presentation layer) without the use of code. DRS 100 also includes meta data, or data about data, which controls the manner in which the data from data source 104 is rendered. Some examples of meta data include page definitions and column properties. Thus, DRS 100 advantageously eliminates any requirement for code generation within the middleware tier. Unlike traditional models of web page generation, DRS 100 is able to render web application 102 without the generation of any code. As a result, DRS 100 closes the gap between the programming and business aspects of a company. By using DRS 100, a business individual who is most familiar with the company's needs, can construct a web application addressing those needs without having to go through a web designer and programmer.

In one example, DRS 100 is implemented as a client server network, or server system. Client/server describes a relationship between two computer programs in which one program, the client, makes a service request from another program, the server, which fulfills the request. Although the client/server idea can be used by programs within a single computer, it is a more important idea in a network. In a network, the client/server model provides a convenient way to interconnect programs that are distributed efficiently across different locations.

In the client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services from a Web server in another computer somewhere on the Internet.

Any number of individuals, including a web administrator, a regional manager, a salesperson, and even a customer, may use DRS 100. As detailed below, DRS 100 uses the identity of the end user to determine the level for user access.

FIG. 2 illustrates process 200, which renders a selected web page directly onto client browser 108. Process 200 determines (204) whether a designer user wishes to edit a pre-existing web application. If the designer user chooses to edit, she is sent to process 600, which illustrates the editing of web applications on DRS 100. For designer users who do not wish to edit, process 200 concludes that she wishes to design a new web application. Process 200 then queries (206) whether the designer user wants to import the new web application from an external source. If she answers affirmatively, process 200 imports (208) the new web application into DRS 100. However, a negative response from the designer user triggers process 300, which illustrates designing the new web application using DRS 100.

As shown in FIGS. 3 and 4, in designing the new web application, process 300 selects (302) a database for the new web application using sub-process 400. The selected database provides all the data information used by the new web application. Sub-process 400 previews (402) all the available databases that are contained within DRS 100. These available databases were previously imported into DRS 100.

In some implementations, the importing of the database is accomplished by pointing DRS 100 to a specific location. However, other implementations of importing the database can exist.

Sub-process 400 inquires (404) whether the designer user is satisfied with the selection of available databases. If satisfied, the designer user selects (406) the desired database and saves (408) her selection in DRS 100. If the designer user is dissatisfied, sub-process 400 queries (410) whether she wants to add any new databases into DRS 100. An affirmative answer from the designer user prompts process 400 to import (412) new databases into DRS 100 from an external source. Once the databases have been imported (412), the designer user selects (406) the desired database and saves (408) the selection in DRS 100. Designer users who do not import any new databases are limited to selecting (406) a database from those available on DRS 100.

Referring back to FIG. 3, process 300 selects (304) a style format for the new web application using sub-process 412. The style formats represent pre-designed templates, each containing any number of preset specifications that control the overall appearance of the web application, such as color, font size, font type, data arrangement, and various images. As described below, the designer user can select (304) for the new web application either a pre-designed style format, or she can design a customized style format.

As shown in FIG. 4, sub-process 414 previews (416) all the available style formats contained within DRS 100, and inquires (418) whether the designer user is satisfied with the available options. If the designer user is satisfied with the selection, she selects (420) a desired style format and saves (422) the selection in DRS 100.

Where the designer user is dissatisfied with the available options, sub-process 414 queries (424) whether she wants to add any new style formats to DRS 100. If she answers affirmatively, sub-process 414 designs (426) a customized style format by inputting information into a set of pre-determined fields contained within DRS 100. For example, one pre-determined field may prompt the designer user to designate her desired color scheme for the customized style format, while another field may allow the designer user to import Graphic Interchange Format (GIF) images and Joint Photographic Experts Group (JPEG) images from the external source. Any number of variations of pre-determined fields can exist on DRS 100.

After adding customized style formats, sub-process 414 prompts the designer user to select (420) a desired style format, and then saves (422) her selection in DRS 100. Designer users, who choose not to design a customized style format, must select (420) a pre-designed format from DRS 100. Completion of sub-process 414 returns the designer user back to process 300.

Referring back to FIG. 3, process 300 registers various preference properties, or logic, for a new web page via sub-process 306. Although no web page is produced until an actual rendering process occurs (as described in sub-process 700), the registered preference properties are associated with the new web page. Thus, when the web page is actually rendered onto client browser 108, the web page will automatically retrieve data information from the database as selected (406) by sub-process 400, and then visually present the data information according to the style format as selected (420) by sub-process 414. Furthermore, the data information will be presented according to the selected preference properties as registered via sub-process 306.

Sub-process 306 previews (308) a number of pre-determined questions regarding various preference properties for the new web page. Examples of preference properties can include determining the refresh rate, persistent inserts, and manners for modifications. Sub-process 306 fills (310) each field of questions with the designer user's preferences, and saves (312) these preferences in DRS 100. A menu for the new web application is updated (314) with a name for the newly designed web page. Sub-process 306 then determines (316) whether the designer user wishes to design another web page, and repeats sub-process 306 if the designer users wishes to do so.

In one implementation, DRS 100 uses an unique set of questions in order to determine the design user's preferences. This unique set of questions includes selecting a page type for the new web page. These page types include: a dynamic web page that is fully interactive and modifiable; a report page that summarizes the data information; and a static web page that merely displays the data information, but prevents any modification. The unique set of questions also locates a source for the data information by allowing the designer user to choose from a number of available databases. The designer user can determine the amount of information she wishes to display on the new web page.

In addition, the unique set of questions determines whether to permit adding, editing, and/or deleting of a record from the table. The designer user also chooses the manner for adding or editing the record. The designer user also decides whether to allow the web page to support a persistent insert. The persistent insert function allows the end user to add records to the table in a continuous manner. Another question asks whether the designer user wants the web page to remain in the same location after the addition of a record. Still another question asks whether the designer user wants to bypass an edit mode when editing the records. This function allows the end user to edit the records directly on the web page without having to switch to the edit mode. Finally, the designer user can decided whether to add records individually (e.g. one at a time) or whether she wants to add multiple records at the same time. All of the above functions for adding and editing records save the end user much time, especially in situations involving a large quantity of data information.

Furthermore, the unique set of questions determines the manner for filtering the data information, both before and after rendering the new web page. One question asks whether the designer user wants to filter data information that is associated with a horizontal view and a vertical view. Another question determines whether she wants to filter the data information being displayed at run-time. Still another question inquires whether she wants to allow the end user to filter the data information being displayed on the web page. Also, the designer user can limit the number of records being displayed on the web page. For example, she may wish to display only a portion of the records (e.g. within the last six months) from the selected database. If she wishes, she may provide a record count for the end user as well. The record count shows the total number of records being displayed on the new web page.

Other questions within the unique set include whether the design user wants to: make the validation rules optional; turn off the default sort function, which sorts the records alphabetically; select the menu for the web page; permit the downloading of records from the web page; permit the uploading of records to the web page; and select a refresh rate, or the rate for updating new data on the web page. Finally, where the designer user selects a dynamic page type, she may choose whether to include static data information in the new web page as well.

Completion of sub-process 306 prompts process 300 to select (318) validation rules for the new web application 102 using sub-process 500. Each validation rule represents a query that evaluates whether the data contained within the database meets certain requirements imposed by DRS 100. For example, one validation rule may inquire whether data information relating to a calendar date is inputted in the correct format. In another example, the validation rule checks that the product is always priced at a rate higher than the cost of production.

As shown in FIG. 5, sub-process 500 previews (502) all the available validation rules that are contained within DRS 100. Sub-process 500 inquires (504) whether the designer user is satisfied with the available validation rules. If satisfied, the designer user selects (506) one or more validation rule(s) to be applied to the new web application, and saves (508) her selection in DRS 100. If the designer user is dissatisfied with the selection, sub-process 500 queries (510) whether the designer user wants to add any new validation rules into DRS 100. The designer user can register (512) her own validation rules by selecting and inputting information into pre-determined fields within DRS 100.

Upon registration (512) of the new validation rule, the designer user selects (506) her desired validation rule and saves (508) the selection into DRS 100. Designer users, who do not wish to register any new validation rules, can select (506) from pre-existing validation rules that are available on DRS 100.

Sub-process 500 executes the validation rules serially and designates (528) a level of severity for each rule. A level of severity represents a message that is outputted whenever the web application fails a validation rule. In some implementations, DRS 100 can include several levels of severity, such as a severity of warning and a severity of error. The severity of warning provides a message regarding a possible error in the available data. The designer user however can override this message. On the other hand, the severity of error provides a message regarding an absolute error in the available data, and cannot be overridden by the designer user. The designer user is forced to correct any error that results from the severity of error message. Completion of sub-process 500 returns the designer user back to process 300.

Referring back to FIG. 3, process 300 selects (320) business rules for the new web application through sub-process 514. A business rule represents a command for an action that occurs within the workflow. For example, if the end user updates a table for purchase orders with new orders, one business rule automatically deducts or adds the quantity of this order from all linked and relevant databases, such as the databases for inventory, manufacturing, and sales.

As shown in FIG. 5, sub-process 514 previews (516) all the available business rules that are contained within DRS 100. As described below, the designer user can apply to the new web application either a pre-existing business rule, or she can customize the business rule. Sub-process 514 inquires (518) whether the designer user is satisfied with the business rules available in DRS 100. If the designer user is satisfied with the selection, she selects (520) a business rule and saves (522) her selection in DRS 100. If the designer user is dissatisfied, sub-process 514 queries (524) whether she wants to add any new business rules into DRS 100. The designer user can register (526) her own customized business rules by selecting and inputting information into pre-determined fields within DRS 100.

After adding the new business rules, the designer user selects (520) one or more desired business rules to be applied to the new web application, and saves (522) the selection into DRS 100. Designer users who do not wish to design any customized business rules are limited to selecting (520) from the pre-designed formats available on DRS 100. Similar to the validation rules described above, business rules also run serially within DRS 100. In addition, sub-process 514 also prompts the designer user to designate (530) levels of severity for each business rule. Completion of sub-process 514 returns the designer user back to process 300.

Referring back to FIG. 3, process 300 registers (322) one or more group lists for the new web application. A group list contains the names and passwords for end users who are allowed access to the new web application. Group lists help categorize which end users have full access (e.g., modification and deletion rights) and which end users have limited access (e.g., read-only rights). Process 300 then returns to process 200.

Referring back to FIG. 2, process 200 modifies (210) global properties, or meta data, for DRS 100. Meta data represents data about data, such as the name, length, valid values, or description of a data element. Thus, meta data insulates the data warehouse from changes in the schema of operational systems. Process 200 also adds (212) end users and passwords to the new web application. The end users and passwords can be added into one or more of the group lists, which were registered (322) from process 300. When all end users and passwords have been added (212), the new web application is completed (214). Process 200 then triggers process 700, which renders a selected web page onto client browser 108 in real-time.

However, not all users of DRS 100 wish to design a new web application. Users may wish to edit previous web applications using process 600. As shown in FIG. 6, process 600 inquires (602) whether the editing user is the web administrator. The web administrator represents an individual who manages the web application. The web administrator possesses modification rights and privileges to the web application beyond that of an ordinary editing user. If the editing user is the web administrator, process 600 grants (604) full access to web application properties. Process 600 inquires (606) whether the editing user desires to edit the web application properties. If the web administrator choose to edit, process 600 modifies (608) the web application properties according to the web administrator's preferences. Otherwise, process 600 inquires (610) whether the web administrator wants to edit the database information. Similarly, for editing users who are not web administrators, process 600 limits (612) their access to database information only, and the proceeds to inquire (610) whether they want to edit any database information.

If the editing user does not wish to edit database information, process 600 asks (614) whether the editing user would like to produce a report of the database information. Process 600 has the ability to produce (616) a report upon request. Upon the completion of the report, process 600 modifies (618) the various global properties for DRS 100. Process 600 ends once these global modifications are complete.

For editing user who want to edit database information, process 600 modifies (620) the database information and saves (622) these changes in DRS 100. Process 600 then checks (624) whether the new changes pass the validation rules. In one implementation, if the new changes fail the validation rules, process 600 determines whether the error is a severity of warning or a severity of error. For severity of errors, process 600 requires the end user to correct the problem. If the end user is able to correct the error, process 600 applies (626) the business rules; otherwise, process 600 ends.

If the failure stems from a severity of warning, process 600 inquires whether the end user wants to override the warning. If the end user chooses to override the warning, process 600 applies (626) the business rules and ends. Completion of process 600 triggers process 700, which renders a selected web page onto the client browser in real-time.

As shown in FIG. 7, the end user requests (702) a desired web page by selecting or clicking a button or hyperlink on the new web application. Process 700 checks (704) the server's environment for DRS 100. In one implementation, checking (704) includes identifying the directory that has been installed into the server and checking whether the directory is connected to the database. Another implementation checks (704) whether a license key has been provided. Process 700 then determines (706) whether the server's environment has been set up properly. If not, DRS 100 returns (708) an error message, and process 700 ends.

However, if the server's environment is properly set up, then process 700 determines (710) whether the end user can be identified. If the end user cannot be identified, process 700 renders a login page in order to prompt (712) the end user to provide her identity. However, if the identity is known, then process 700 determines (714) the requested web page by looking at parameters passed in the URL.

Once the web page has been determined (714), process 700 checks (716) whether the end user has permission to access the requested web page by matching the end user with one or more of the group lists within the web application. End users who do not match to a group list are denied (718) access, whereas end users who match to a group list are provided (720) with associate actions (e.g. read, edit, delete) within the group list.

Process 700 renders the selected web page by retrieving (724) the selected data (as selected from sub-process 400), retrieving (726) the selected preference properties (as selected from sub-process 306), and displaying (728) the data according to the selected style format (as selected from sub-process 412). Thus, unlike static web pages generated from traditional programming methods, DRS 100 advantageously renders a web page that is fully dynamic.

The newly rendered web page is dynamic on three levels. First, DRS 100 can display the content and any other preference changes dynamically. Each time the end user renders a web page using process 700, DRS 100 retrieves data from the selected database and displays the contents instantaneously in a dynamic web page. Second, the web page can be dynamically interactive. This means that the end user can interact with the data directly on the web page, such as editing, adding, and deleting the data. Third, the web page contains dynamic content, meaning that the end user can modify the content of the data at any point in time. In addition, the end user can also modify the meta data in real-time and display these modifications instantaneously on the newly rendered web page.

The system, described herein, is not limited to use with the hardware and software described herein; they may find applicability in any computing or processing environment and with any type of machine that is capable of running machine-readable instructions, such as a computer program. The system may be implemented in digital electronic circuitry, or in computer hardware, firmware, software, or in combinations thereof. The system may be implemented via a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the system can be performed by one or more programmable processors executing a computer program to perform the functions of the processes of the system. The method steps can also be performed by, and the processes can be implemented as special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a end user, the system can be implemented on a computer having a display device, e.g., a CRT (cathode ray tube) or LCD (liquid crystal display) monitor, for displaying information to the end user and a keyboard and a pointing device, e.g., a mouse or a trackball, by which the end user can provide input to the computer. Other kinds of devices can be used to provide for interaction with a end user as well; for example, feedback provided to the end user can be any form of sensory feedback, e.g., visual feedback, auditory feedback, or tactile feedback; and input from the end user can be received in any form, including acoustic, speech, or tactile input.

The system can be implemented in a computing system that includes a back-end component, e.g., as a data server, or that includes a middleware component, e.g., an application server, or that includes a front-end component, e.g., a client computer having a graphical user interface or a Web browser through which a end user can interact with an implementation of the record extractor, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The processes of the system are not limited to the implementations set forth herein. For example, the steps of the processes can be rearranged and/or one or more such steps can be omitted to achieve similar results. The system may link to existing business models, thereby providing enhanced flexibility. The processes may be fully automated, meaning that they operate without user intervention, or interactive, meaning that all or part of each process includes some user intervention.

The system, described herein, is not limited to the specific formats set forth above. Elements of different implementations may be combined to form another implementation not specifically set forth above. Other implementations not specifically described herein are also within the scope of the following claims.

What is claimed is:

1. A method comprising:
providing a first interface to facilitate user design of a web application for rendering a database absent user-supplied code, wherein designing the web application comprises using a graphical user interface included in the first interface to select the database and specify a style format from a plurality of previously stored style formats or a newly registered style format, and using a graphical user interface included in the first interface to specify a validation rule previously stored or newly registered by the user; and
providing a second interface to facilitate user access to data, wherein the second interface uses the web application to render a dynamic webpage that displays data from the database.

2. The method of claim 1, wherein designing the web application comprises using a graphical user interface included in the first interface to select the database and specify a style format from a plurality of previously stored style formats or a newly registered style format produced from user-prompted information.

3. The method of claim 1, further comprising editing data in the database using the dynamic webpage.

4. The method of claim 1, wherein designing the web application comprises using a graphical user interface included in the first interface to specify a business rule.

5. The method of claim 4, further comprising editing data in the database using the dynamic webpage and applying the business rule to edit associated records in a related database.

6. The method of claim 1, further comprising editing data in the database using the dynamic webpage and applying the validation rule to generate warning or error messages.

7. A computer program product, tangibly embodied in a machine readable storage device, the computer program product being operable to cause a data processing apparatus to:
provide a first interface to allow a user to design a web application for rendering a database absent user-supplied code, wherein designing the web application comprises using a graphical user interface included in the first interface to select the database and specify a style format from a plurality of previously stored style formats or a newly registered style format, and using a graphical user interface included in the first interface to specify a validation rule previously stored or newly registered by the user; and
provide a second interface to facilitate user access to data, wherein the second interface uses the web application to render a dynamic webpage that displays data from the database.

8. The computer program product of claim 7, wherein designing the web application comprises using a graphical user interface included in the first interface to select the database and specify a style format from a plurality of previously stored style formats or a newly registered style format produced from user-prompted information.

9. The computer program product of claim 7, further operable to allow the user to edit data in the database using the dynamic webpage.

10. The computer program product of claim 7, wherein designing the web application comprises using a graphical user interface included in the first interface to specify a business rule.

11. The computer program product of claim 10, further operable to:
allow the user to edit data in the database using the dynamic webpage; and
apply the business rule to edit associated records in a related database.

12. The computer program product of claim 7, further operable to allow the user to edit data in the database using the dynamic webpage and apply the validation rule to generate warning or error messages.

13. A system comprising:
a display device;
a computer driving the display device and configured to execute a web browser; and
one or more processors in the computer or communicating with the computer via a communication network, the one or more processors configured to:
provide a first interface to allow a user to design a web application for rendering a database absent user-supplied code, wherein designing the web application comprises using a graphical user interface included in the first interface to select the database and specify a style format from a plurality of previously stored style formats or a newly registered style format, and using a graphical user interface included in the first interface to specify a validation rule previously stored or newly registered by the user, and
provide a second interface to facilitate user access to data, wherein the second interface uses the web application to render a dynamic webpage that displays data from the database.

14. The system of claim 13, wherein the first interface includes a graphical user interface for selecting the database and specifying a style format from a plurality of previously stored style formats or a newly registered style format produced from user-prompted information.

15. The system of claim 13, wherein the one or more processors are further configured to allow the user to edit data in the database using the dynamic webpage.

16. The system of claim 13, wherein the first interface includes a graphical user interface for specifying a business rule.

17. The system of claim 16, wherein the one or more processors are further configured to:
 allow the user to edit data in the database using the dynamic webpage; and
 apply the business rule to edit associated records in a related database.

\* \* \* \* \*

UNITED STATES PATENT AND TRADEMARK OFFICE
CERTIFICATE OF CORRECTION

| | |
|---|---|
| PATENT NO. | : 11,755,819 B2 |
| APPLICATION NO. | : 16/875959 |
| DATED | : September 12, 2023 |
| INVENTOR(S) | : Thomas R. Kennedy, Jr. |

It is certified that error appears in the above-identified patent and that said Letters Patent is hereby corrected as shown below:

On the Title Page

Item (71), Line 1, delete "BackOffice Associates, LLC," and insert -- BackOffice Associates, LLC d/b/a Syniti --

Signed and Sealed this
Seventh Day of November, 2023

Katherine Kelly Vidal
*Director of the United States Patent and Trademark Office*